United States Patent [19]

Yamano et al.

[11] Patent Number: 4,767,965
[45] Date of Patent: Aug. 30, 1988

[54] FLAT LUMINESCENT LAMP FOR LIQUID CRYSTALLINE DISPLAY

[75] Inventors: Masaru Yamano, Hirakata; Katsuhiro Hinotani, Shijonawate; Hajime Hayama, Nara; Shunichi Kishimoto, Kaizuka; Nobutake Kawamori, Moriguchi; Katsumi Terada; Kazuhiro Kono, both of Hirakata, Yasuo Funazo, Hirakata, all of Japan

[73] Assignee: Sanyo Electric Co., Ltd., Osaka, Japan

[21] Appl. No.: 928,133

[22] Filed: Nov. 7, 1986

[30] Foreign Application Priority Data

Nov. 8, 1985 [JP] Japan ............................ 60-172540[U]
Mar. 12, 1986 [JP] Japan .................................. 61-54194

[51] Int. Cl.$^4$ ...................... H01J 61/067; H01J 61/30
[52] U.S. Cl. ..................................... 313/491; 313/493; 313/631
[58] Field of Search ................. 313/491, 493, 489, 15, 313/292, 631, 632, 634

[56] References Cited

U.S. PATENT DOCUMENTS 3,967,153  6/1976  Milke et al. .................... 313/489
4,376,256  3/1983  Hanlet ........................ 313/491 X

FOREIGN PATENT DOCUMENTS 60-189154  9/1985  Japan .

Primary Examiner—David K. Moore
Assistant Examiner—K. Wieder
Attorney, Agent, or Firm—Armstrong, Nikaido, Marmelstein & Kubovcik

[57] ABSTRACT

In a flat luminescent lamp fitted to an under surface of the liquid crystalline TV display panel to backlight its image, a pair of the electrode plates 14 of cold cathode type are opposingly positioned in the cavity. The electrode plate has a concave cross section, auxiliary electrodes on each electrode plate project toward the other electrode plate from both terminations and has a lead plate projecting outwardly in the same direction as the extract tube of the lamp.

18 Claims, 5 Drawing Sheets

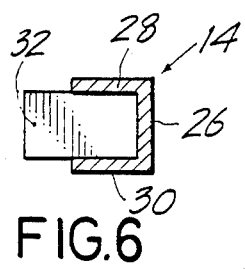 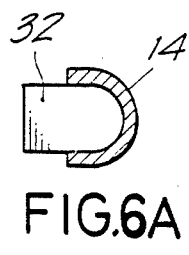 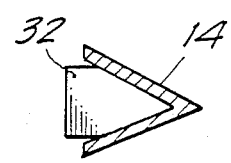
FIG.6  FIG.6A  FIG.6B
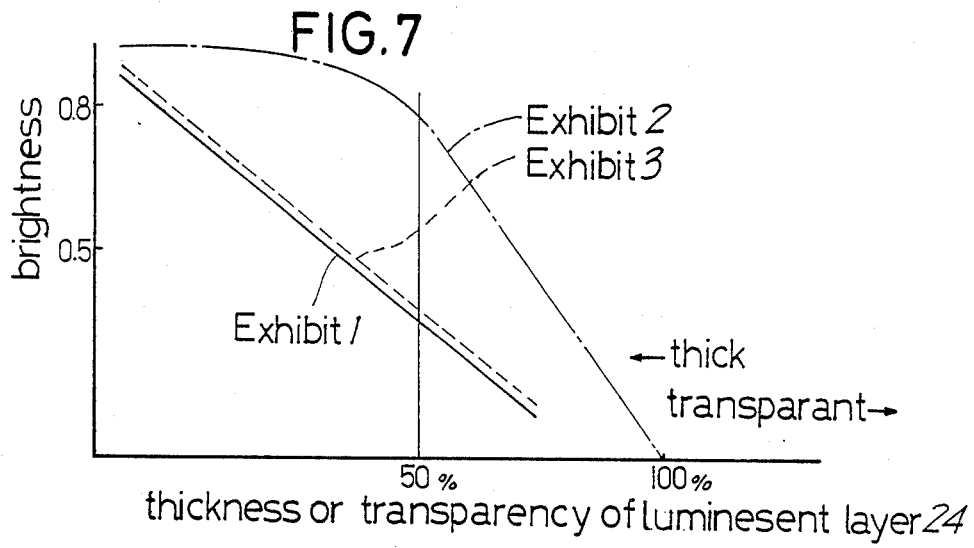
FIG.7
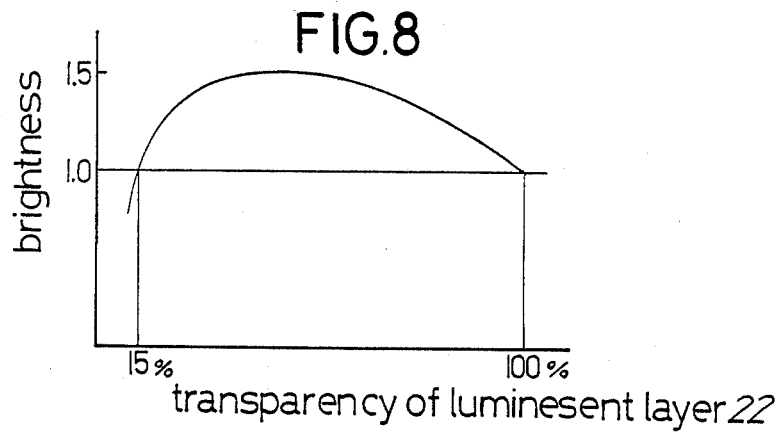
FIG.8
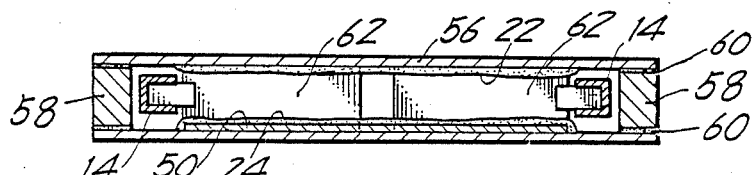
FIG.10

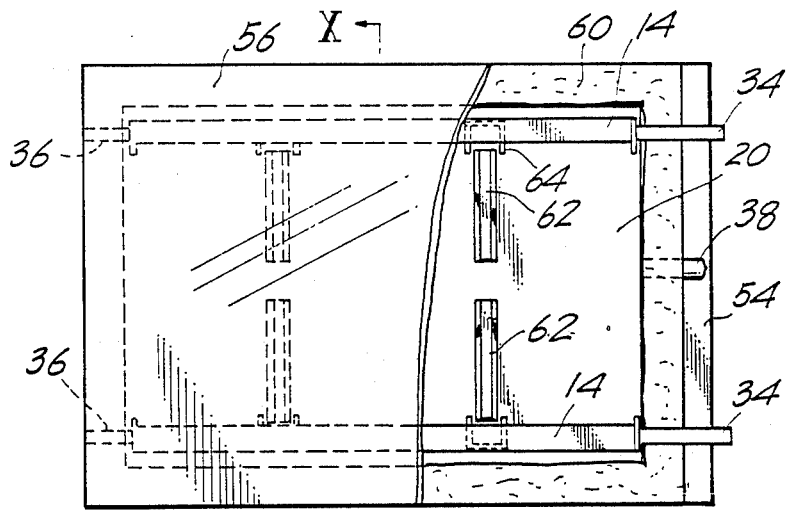
FIG.9
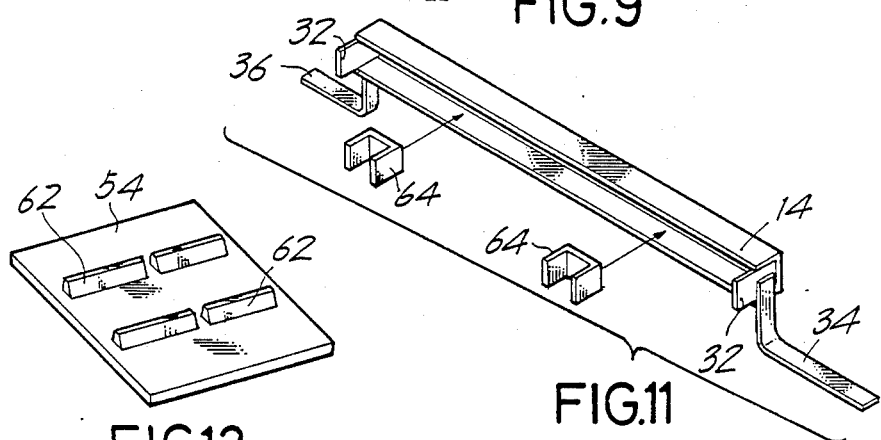
FIG.11
FIG.12
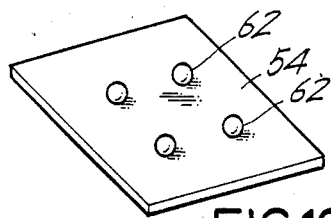
FIG.12B
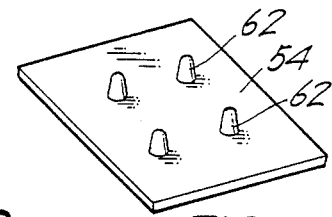
FIG.12D
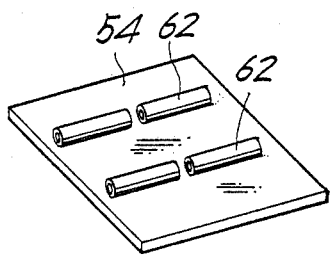
FIG.12A
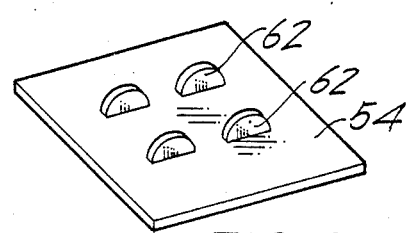
FIG.12C

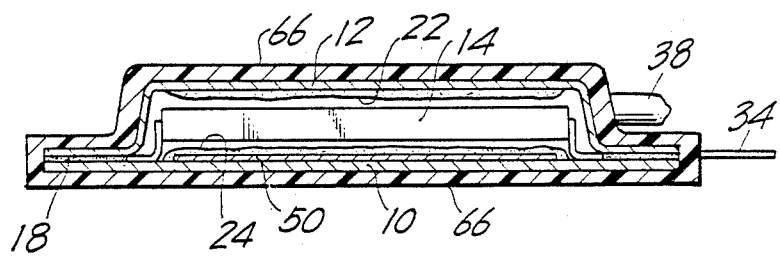
FIG.13
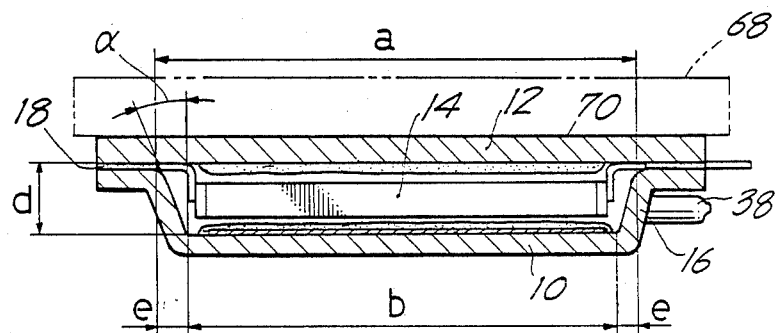
FIG.14
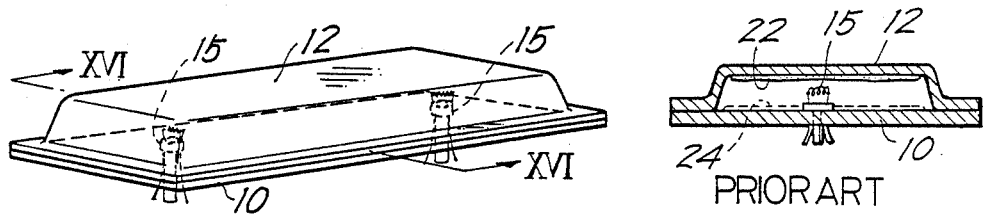
PRIOR ART
FIG.15
PRIOR ART
FIG.16
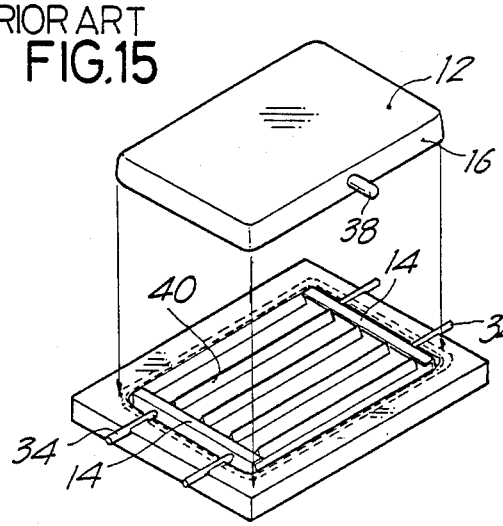
FIG.17
PRIOR ART

FLAT LUMINESCENT LAMP FOR LIQUID CRYSTALLINE DISPLAY

FIELD OF THE INVENTION

The present invention pertains to a flat luminescent lamp for use in backlighting a liquid crystalline display panel, especially for a liquid crystalline TV.

BACKGROUND OF THE INVENTION

A liquid crystalline TV has been developed for practical use which has a liquid crystalline display panel, the depth of the display panel is thin in comparison to a conventional display of a CRT. However, the liquid crystalline display panel does not radiate light itself, therefore, the image appearing on the panel is too dark to be recognized without the aid of some backlight to illuminate the image from rearside through the panel.

A flat luminescent lamp is disclosed in a published unexamined Japanese Utility Model Application SHO. No. 54-111985 and a published unexamined Japanese Patent Application SHO. No. 54-90877 as shown in FIGS. 15 and 16. These lamps consist of a lower glass panel 10 and upper glass panel 12 forming a vacuum cavity between them. Luminescent layers 22, 24 cover the inner surface of both panels, and a pair of electrodes 15 of hot cathode type is positioned in the cavity.

However, these lamps were developed for the use of lighting rooms and atmosphere not for the purpose of backlighting the liquid crystalline display panel. The shapes of the lamps are too narrow to be applied to the liquid crystalline TV display panel. Therefore, they cannot illuminate the TV display panel uniformly, also they are apt to produce uneven brightness for the image on the display panel even if they are used as a backlighting device for liquid crystalline display panel.

Furthermore, since they are driven with an alternative current being applied with alternating voltage to the electrodes 15, a noise caused by the alternating electric current and noise caused by plasma radiation at the electrodes enter the TV electric circuits to disturbe the TV image on the display panel.

The applicants of the present invention have previously developed a flat luminescent lamp which is disclosed in the published unexamined Patent Application SHO. No. 60-189154. The lamp is shown in FIG. 17 which consists of a lower glass panel 10 having an elevated margin at its entire periphery and spacing walls 40 extending longitudinally on its inner surface, an upper glass panel 12 forming a cavity between the lower glass panel 10 and a pair of electrode plates 14, 14 of the cold cathode type opposingly positioned in the cavity.

Luminescent layers are provided on the inner surface of both panels. The flat luminescent lamp in FIG. 17 can be used to backlight the liquid crystalline TV display panel but it was found still unfit for the liquid crystalline TV because of its uneven luminescent brightness to the display panel since the electrode plates 14, 14 emit most of electrons from a central portion of the electrode plates 14 and fewer from its sides.

Another problem of the flat luminescent lamp is that it is an inconvenient structure to be installed to or to be detached from the liquid crystalline display panel because each electrode plate 14 projects its lead plate 34 in the opposite direction from the under glass panel 10, therefore, a plug to provide access to the lead plate 14 ought to be provided at both longitudinal sides of the lamp which requires more space in the device of the liquid crystalline TV display.

SUMMARY OF THE INVENTION

An object of the present invention is to backlight the liquid crystalline display panel uniformly.

Another object of the present invention is to improve the flat luminescent lamp structure so as to be able to be mounted to the display set in an easy manner.

A still further object of the invention is to reduce the size and weight of the flat luminescent lamp while maintaining the character of uniform backlighting.

A further object of the invention is to prolong the life of the flat luminescent lamp by placing a non-flashed getter in the space of extract tube.

BRIEF DESCRIPTION OF DRAWINGS

FIG. 6 is a sectional view of the electrode plate taken along the line VI—VI in FIG. 5, FIGS. 6A and 6B are sectional views of other modifications of the electrode plate, FIG. 7 is a graph showing the relation in the lower glass panel between the thickness or transparency of the luminescent layer and its brightness, FIG. 8 is a graph showing the relation in the flat luminescent lamp between the transparency of the luminescent layer on the upper glass panel and brightness of the lamp, FIG. 9 is a plan view of another modification of the flat luminescent lamp partially broken to show the electrode plate, FIG. 10 is a sectional view taken along line X—X in FIG. 9, FIG. 11 is a perspective view of an electrode plate in the modification of FIG. 9, FIG. 12 is a perspective view of a lower glass panel in FIG. 9, FIGS. 12A to 12D are perspective views of other modifications of lower glass panels, FIGS. 13 and 14 are sectional views of another modification of the flat luminescent lamp, FIG. 15 is a perspective view of a conventional flat luminescent lamp, FIG. 16 is a sectional view taken along the line XVI—XVI in FIG. 15 and FIG. 17 is a perspective view of another type of conventional flat luminescent lamp showing the upper glass panel separated from the lower glass panel.

DETAILED DESCRIPTION OF THE INVENTION

Figure 1:
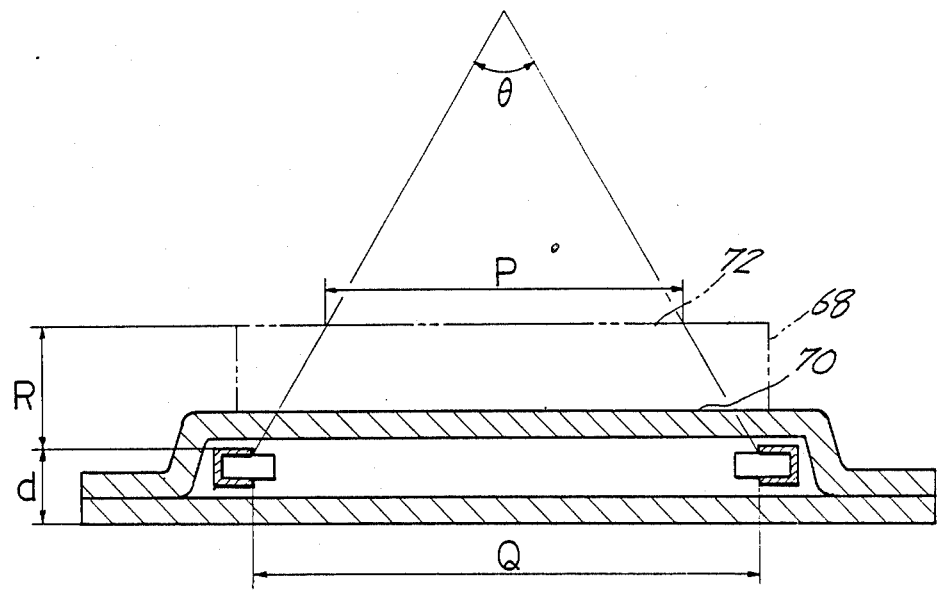
FIG. 1 is a cross sectional view of the assembled liquid crystalline display panel and the flat luminescent lamp.
Figure 2:
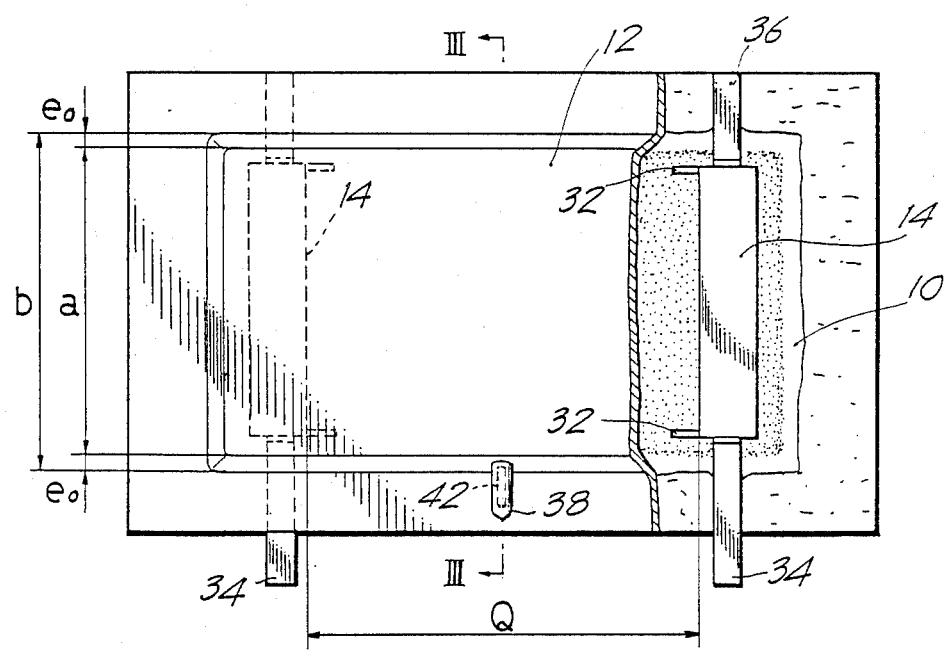
FIG. 2 is a plan view of the flat luminescent lamp partially broken to show the electrode plate.
Figure 3:
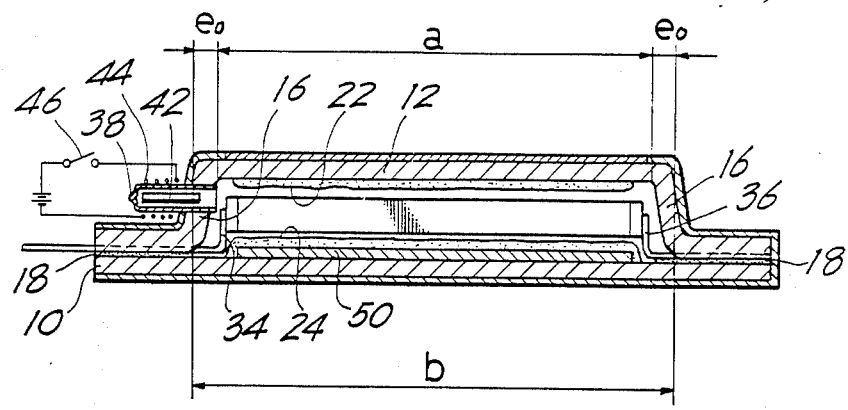
FIG. 3 is a sectioned elevation view taken along the line III—III in FIG. 2.

The flat luminescent lamp of the present invention comprises a lower glass panel 10, an upper glass panel 12 and a pair of electrode plates 14 as shown in FIGS. 1 to 3. The upper glass panel 12 has side glass walls 16 projecting downwardly from the periphery of the upper glass panel 12 and the lower edge face of the side glass walls are connected to the lower glass panel sealingly by placing and fusing frit glass 18 between them.

The upper and lower glass panels are formed to the ratio of length to width 3:4 to fit to a liquid crystalline TV display panel. Between the upper and lower glass panels 10, 12, an air tight cavity 20 is formed.

On the inner surface of the respective panels, luminescent layers 22, 24 of a specific thickness as described later is formed.

A pair of electrode plates 14, 14 made of stainless steel or Ni - Fe alloy is symmetrically positioned at the opposite sides in the cavity 20. The electrode plates 14 form a cold cathode type lamp discharging electrons from its surface without heating it by electricity.

Figure 5:
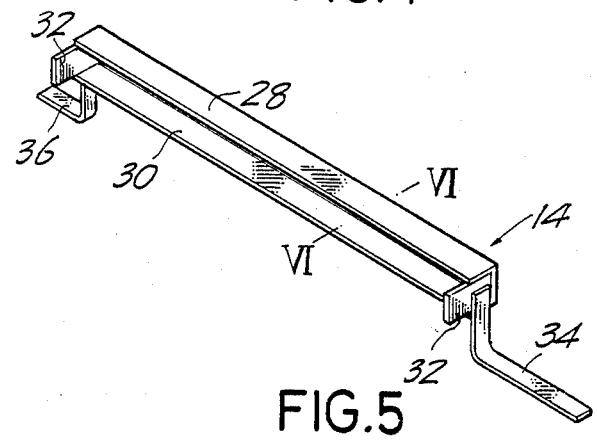
FIG. 5 is a perspective view of an electrode plate.

As shown in FIGS. 5 and 6 the electrode plate 14 has a concave cross section in the form of channel by bending the upper and lower edges of the vertical portion 26 perpendicularly forming upper and lower flanges 28, 30 so as to increase the area of discharging electrons.

The cross section of the electrode plate 14 is not limited to the channel shape but concave forms such as a curved section (FIG. 6A) and a V-shaped section (FIG. 6B) are applicable to the electrode plate.

From both terminal portions of the vertical portion 26, plate-shaped auxiliary electrodes 32 made of the same material as the main electrode plate 14 project symmetrically toward the other electrode plate 14. The auxiliary electrode 32 is a little longer than the upper and lower plates 28, 30 so that electrons are discharged from the auxiliary electrode 32 by a lower electric potential than the main electric plate 14 in accordance with the Paschen's law.

Both electrode plates 14, 14 are provided with a lead plate 34 by fixing its inner termination on the auxiliary electrode 32 of the same side and with a restraining piece 36 on the other auxiliary electrode 32.

The restraining piece 36 and the lead plate 34 project downwardly first from the auxiliary electrode 32 and are bent perpendicularly and outwardly at the lowermost end. The outer termination of the restraining piece 36 is held between the edge face of the side glass wall 16 and lower glass panel 10 and sealingly fixed there by means of fused frit glass 18.

The lead plate 14 also is pinched and sealingly fixed between the edge face of the side glass wall 16 and the lower glass panel 10, however, the outer termination of the lead plate 34 projects and extends outwardly from the side glass wall 16.

Since the lead plate 34 and the restraining piece 36 are bent at their lowermost end, they not only support the electrode plate 14 in position in the cavity, they allow the thermal shrinkage of the lower and the upper glass panels 10, 12 by the resilient deformation at their bent portion to avoid producing inner stress in the glass panels because of the difference of ratio of thermal expansion between the glass panels and electrode plate 14 when they are cooled to room temperature from the temperature of fusing the flint glass to connect the edge face of side walls to the lower glass panel.

On the side glass wall 16, an extract tube 38 is provided which has a hollow cylindrical inner space communicating to the cavity 20 between panels 10, 12. Through this extract tube 38, the air in the cavity 20 is extracted and Hg gas (0.006 mm Hg vapor pressure at lighting stage) and Ar gas (several mm Hg) is injected into the cavity, then the tip of the extract tube 38 is fused to form a seal.

The extract tube 38 is fragile, therefore, it is protected as shown in FIGS. 2 and 3 by extending the lower glass panel 10 and flange of side wall 16 under the extract tube further than the tip of the extract tube.

Figure 3A:
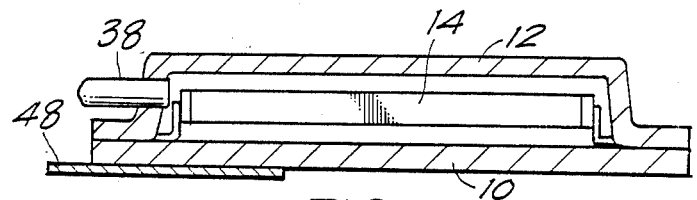
FIG. 3A is a sectional view of a modification of the flat luminescent lamp.

However, it is possible as shown in FIG. 3A to fix protecting board 48 under the lower glass plate 10 extending further than the tip of the extract tube 38.

In the cylindrical space of the extract tube 38 a getter piece 42 of non-flashed type is placed. The getter (made by SAESU getters Japan Co., Ltd.) is made of nickel substrate having a film of Zn - Al alloy on one of the surface of the substrate and a film of Hg - Ti alloy on the other side of the substrate. The getter 42 is rounded and expands resiliently in the space of the extract tube 38 to be fixed there. The getter is activated by heating it to a temperature not less than 800° C. It is advisable to heat the getter by surrounding the extract tube 38 from outside with a high frequency coil.

The magneto-electric energy of high frequency is concentrated to the getter causing it to be heated to the elevated temperature over 800° C. in an instant. The advantage of using a high frequency coil is to provide an immediate heating of the getter without harm to the luminescent layers.

Once the getter is activated the film of Zn - Al alloy absorbs by chemical reaction the impure gaseous atoms such as $O_2$ and $N_2$ being produced from the electrode plates and the interior of glasses, and prolongs the life of the flat luminescent lamp.

Since the getter of the present invention is not flashed in the cavity of lamp, the composition of getter makes no covering film over the luminescent layer, therefore, it does not harm the brightness of the lamp.

Furthermore, the film of Hg - Ti alloy on the getter produces Hg gas in the cavity of an lamp with the accurate predetermined vapour pressure.

The brightness of the lamp has a tendency of being weakened proportionally with a decrease of temperature. At the temperature of 0° C., the brightness is weakened to one half of the brightness in comparison with the brightness at room temperature. This tendency is caused by the sensitivity of saturated Hg gaseous pressure to temperature. Therefore, once the flat luminescent lamp is applied to the liquid crystalline display panel to backlight it, a problem of dark image may be expected during the winter season.

In order to avoid the trouble of this problem in the winter season, mounting an electric heater 44 made of nickel chrome alloy around the extract tube 38 is effective as shown in FIG. 3. The electric heater 44 is controlled by a switch 46 which closes a circuit when the flat luminescent lamp is turned on and maintains the getter 42 at the temperature of 40° C. to activate the vaporization of Hg gas resulting high brightness of the lamp even in the winter season.

Since the area to be heated is restricted to the small extract tube 38, power for such heating is very low. Through our experiment it is found that the brightness of the lamp increases proportionally with the pressure in the cavity of the lamp. However, in the conventional flat luminescent lamp such as the one shown in FIG. 17, uneven discharge of electrons concentrated mainly from the central portion of the electrode 14 is apt to occur when the pressure in the cavity is increased higher than 4.4 Torr.

Whereas in the present invention the pressure in the cavity can be rised up to 5.5 Torr while maintaining uniform discharge of electrons along the entire length of the electrode plate 14 since in the present invention projecting auxiliary electrodes 32 are able to induce electrons there and also decrease the critical electric potential between the opposing auxiliary electrodes 32, 32 under Paschen's law.

A thin reflecting film 50 of aluminum is provided over the inner surface of the lower glass panel 12 by vacuum evaporation process, as shown in FIGS. 1 and 3. The luminescent layer 24 is provided on the reflecting film 50. The reflecting film 50 is effective to increase the brightness of the lamp by reflecting the luminescent light from the upper and lower luminescent layers 22, 24 toward the upper glass panel 12.

Figure 4:
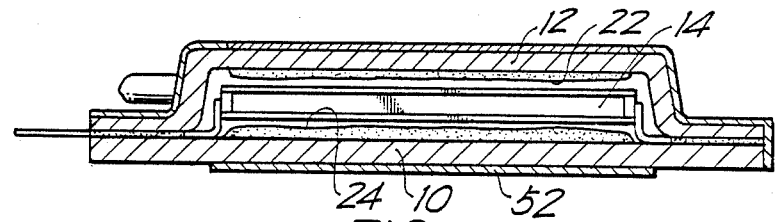
FIG. 4 is a sectional view of another modification.

As shown in FIG. 4 it is also effective to provide a reflecting film 52 on the outer surface of the lower glass panel 10 instead of the reflecting film 50 on the inner surface of the panel 10.

The graph of FIG. 7 indicates the relation between the thickness or transparency of the luminescent layer 24 on the lower glass panel 10 of various embodiments and the brightness of the lower glass panel 10 when the panel 10 is exposed to an ultra-violet ray (wave length is 253 um) of predetermined strength. The lower glass panel is 1 mm thick. Since the luminescent layer becomes more transparent when the thickness becomes thinner, the transparency of the luminescent layer is inversely proportional to the thickness of the layer.

The solid line in the graph represents the relation having no reflecting layer on the panel (Exhibit 1). The alternate long and short dash line represents the relation having the reflecting layer 50 on the inner surface of the panel as shown in FIG. 3 (Exhibit 2). The broken line represents the relation having the reflecting layer 52 on the outer surface of the panel as shown in FIG. 4 (Exhibit 3). The brightness in the graph is not measured by its intensity but by relative ratio in comparison to the brightness of a device having no reflecting layer. From the graph it is apparent that the Exhibits 2 and 3 are always brighter than the Exhibit 1 at any thickness of the luminescent layer 24. The Exhibit 2 is the brightest. Though the brightness of the Exhibit 3 is lower than the Exhibit 2, it is still brighter than the Exhibit 1. Providing the reflecting film 50 or 52 on the lower glass panel 10 is definitely effective to increase the brightness of the lower glass panel 10. As to the Exhibit 2 the brightness increases inversely proportional with the transparency of the luminescent layer 24 on the panel 10. But when the luminescent layer 24 is so thickened as to make its transparency lower than 50%, the brightness is saturated showing little increase. From the reason above the thickness of the luminescent layer 24 on the lower glass panel 10 is preferably such that its transparency is about 50% or less.

The graph of FIG. 8 indicates the relation between the transparency of the luminescent layer 22 and brightness of the upper glass panel 12 detected from the outside when the luminescent layer is exposed to a ultra-violet ray of predetermined strength. The brightness in the graph is measured by relative ratio in comparison to the brightness of the panel having no luminescent layer on it.

From the graph it is found that excessive thickness of the luminescent layer shows no increase in brightness of the upper glass panel. When the luminescent layer is so thickened as to make its transparency lower than 15%, the ratio of brightness becomes lower than the panel having no luminescent layer. The result means that the luminescent layer of excessive thickness harms the radiation of luminescent light emitted from the interior of the layer itself and the light from the lower glass panel. Therefore, the thickness of the luminescent layer 22 on the upper glass panel is limited not to make its transparency lower than 15%.

A desirable brightness is obtained by controlling the thickness of the luminescent layers 22, 24 respectively wherein the transparency of the luminescent layer for the upper panel is 39.8% and for the lower panel is 18.2%.

As shown in FIGS. 9 and 10, the flat luminescent lamp can be made by flat glass plate without using cast glass panels. In this modification the lower glass panel 54 and the upper glass panel 56 are made by flat glass plates. Between both panels 54, 56, side walls 58 made by a glass frame is placed and connected sealingly to the peripheral area of both panels 54, 56 by fusing flint glass 60, 60 between the edge faces of the side walls 58 and panels 54, 56 to form cavity 20.

A pair of electrodes 14 is positioned at opposite sides in the cavity and opposingly placed there by holding their lead plate 34 and restraining piece 36 between the lower glass plate 54 and the side glass walls 58. Support pieces 62 made of glass are provided on the lower glass panel 54 by connecting them by fused frit glass. The support pieces 62 have a trapezoidal cross section supporting the inner surface of the upper glass panel 56 with their upper edge face. Both side surfaces of the support piece 62 are covered with a luminescent layer.

Not to isolate the cavity 20 when air in the cavity is extracted by the tube 38, the support pieces 62 are separated into pieces forming an air path between them.

As shown in FIG. 11, auxiliary electrode pieces 64 having a channel cross section are put into the electrode plate 14 projecting auxiliary electrodes at both sides of the support pieces 62 for uniform discharge of electrons.

The support pieces 62 are not limited to the shape of trapezoidal cross section but support pieces made of glass pipes (FIG. 12A), glass balls (FIG. 12B), half discs (FIG. 12C) and projections (FIG. 12D) are also applicable placing them at proper position on the lower glass panel 54 and connecting them with fused frit glass.

There are numerous advantages in reducing the size and weight of the flat luminescent lamp if it is made by plane glass plates and a frame of side walls such as the modification of FIGS. 9 and 10. For example, the electrode plate 14 can be positioned closer to the corners of side walls 58 and upper and lower glass panels resulting in the reduction of dead space at corner portions. Whereas in the lamp having cast upper and lower panels such as the modification of FIGS. 1 to 3, the electrode plate 14 is obliged to be placed apart from the side walls resulting in the increase of dead space in the cavity because corner portions in the upper glass panel 12 need to be curved for casting, and the side walls are inclined for taking out the panel from the casting dies.

In the modification of FIGS. 1 to 3, the flat luminescent lamp for a liquid crystalline TV display panel of five inches has the size of 154 mm long, 112 mm wide and 18 mm thick without including extract tube and lead plate. The thickness of glass is 4 mm and the total weight is 450 grams.

Whereas in the modification of FIGS. 9 and 10, the lamp has the size of 144 mm long, 99 mm wide and 17 mm thick. The thickness of glass is 4 mm and the total weight is 360 grams.

As shown in FIG. 13, it is preferable to cover the whole outer surface of the lamp with a layer 66 of transparent synthetic resin by molding in order to reduce the weight of the lamp. The resin for this purpose should be of pure transparency, highly endurable to impact, highly fitting and adhesive to glass such as polycarbonate, polyimid, methacryl, etc.

The thickness of the resin layer 66 should be 5 mm, but the thickness of both upper and lower glass panels 10, 12 is reduced to 1 mm. Since the specific gravity of the resin layer 66 is one half of the glass, the total weight of the lamp is reduced remarkably. The resin layer 66 is effective to protect the upper and lower glass panels 10, 12 from being crashed by the atmospheric pressure, therefore, the extract tube 38 and the lead plate 34 should be exposed to the outside so as to extract air in the cavity after the resin layer 66 is molded on the glass panels.

As shown in FIG. 1, the flat luminescent lamp is assembled to the liquid crystalline display panel 68 by fitting the outer flat plane of the upper glass panel 12 with a transparent adhesive to the lower surface of the display panel 68.

The display panel 68 in FIG. 1 is the conventional liquid crystalline TV display panel of the type using an amorphous silicon TFT active matrix.

The effective area of the illumination plane 70 upon the flat luminescent lamp should be larger than the area of the specific displaying plane 72 of the display panel 68 by the dimension as mentioned hereafter.

In FIG. 1, P represents the length of the displaying plane 72, Q represents the effective length of the illumination plane 70, R represents the thickness of the display panel 68 measured from the displaying plane 72 to the upper flange 28 of the electrode plates 14 and $\theta$ represents the angle being made to cover the displaying plane 72 to watch it from a proper distance away from the display panel 68.

For the flat luminescent lamp to illuminate the whole area of the displaying plane 72, the following relation should be achieved.

$$Q \geq P + 2R \tan(Q/2)$$

In practical use, $\theta$ is 90° and R is 5 mm, therefore, the said relation is rewritten as follows.

$$Q \geq P + 10 \, mm$$

By making the effective length $\theta$ of the illumination plane 70 upon the lamp 10 mm longer than the length P of the displaying plane 72, the whole area of the displaying plane 72 can be illuminated.

By the same reason, the width of the illumination plane 70 of the lamp is longer than the width of the displaying plane 72 by a proper dimension.

FIG. 14 shows another modification of the present invention in which upper glass panel 12 is made of a flat glass plate whereas lower glass panel 10 is made by a casting process having side glass walls 16 slanting outwardly at its entire periphery. The side glass walls 16 have a horizontal flange and are connected at the flange to the periphery of the upper glass panel 12 by fusing flint glass 18 between them.

In this modification, the width a of the illumination plane 70 is the same as that in the modification of FIGS. 1 to 3 but the width b of the lower glass panel 10 is smaller than that in FIGS. 1 to 3 by the dimension 2e because in the modification by FIG. 14 the side walls 16 are slanting upwardly and outwardly which makes the difference from FIGS. 1 to 3.

In practice when the slanting angle $\alpha$ of the side walls is 20°, the width b of the lower panel is 50 mm and the height d of the side walls is 6 mm, then the area of the illumination plane 70 is increased by 8.7% more than the modification of FIGS. 1 to 3.

The present invention is not limited to the description and drawings, rather it should be understood that there are various kinds of modifications within the scope of the claims for the man skilled in the arts, and those modifications are also included in the present invention.

What we claimed is:

1. A flat luminescent cold cathode type lamp for a liquid crystalline display panel comprising:

a lower glass panel of rectangular shape having a luminescent layer covering substantially all of its upper surface, an upper glass panel of rectangular shape having a luminescent layer covering substantially all of its lower surface and sealingly connected to the periphery of the lower glass panel by means of side glass walls provided between both panels so as to form a flat rectangular cavity for an electric discharge between the upper and lower panels, the side glass walls having an exhaust tube projecting outwardly, a single pair of parallel electrode plates of the cold cathode type having a concave cross section, one of said electrodes being positioned at each end of the cavity, the electrode plates each having auxiliary electrodes formed at both terminations of the electrode plate extending toward the other electrode plate, a restraining piece mounted at its inner termination to each electrode plate and having its outer termination being held between the edge face of the side wall and the lower glass panel, and each electrode plate having a lead plate mounted at its inner termination to the electrode plate extending outwardly in the same direction as the exhaust tube but in the opposite direction to the restraining piece, the lead plate being pinched between the edge face of the side wall and the lower glass panel and projecting outwardly from the side glass wall, at least one of the restraining piece and the lead plate of each electrode plate being bent in its length at a position between the electrode plate and the side glass wall so as to deform resiliently when the upper and the lower glass panels are cooled to room temperature from an elevated temperature used for connection of the upper and lower glass panels, said pair of electrode plates forming a substantially uniform electric discharge throughout said flat rectangular cavity so as to evenly illuminate said luminescent layers.

2. The flat luminescent lamp as defined in claim 1 wherein the upper and lower glass panels have a ratio of length to width of substantially 4 to 3 to fit to a flat liquid crystalline TV display.

3. The flat luminescent lamp as defined in claim 1 wherein the lower glass panel has a flange projecting outwardly further than the length of the exhaust tube.

4. The flat luminescent lamp as defined in claim 1 wherein the lower glass panel is covered at its inner surface with a reflecting film and the luminescent layer is provided on the reflecting film.

5. The flat luminescent lamp as defined in claim 1 wherein the lower glass panel is provided at its outer surface with a reflecting film.

6. The flat luminescent lamp as defined in claim 1 wherein the whole outer area of the upper and the lower glass panels and side glass walls except the area around the lead plate exposed outwardly is covered with an electro-conductive film and the film covering the panel for mounting to liquid crystal display is made with a transparent electro-conductive material.

7. The flat luminescent lamp as defined in claim 1 wherein the cross section of the electrode plate is one of a channel, a curved concave and a V shape.

8. The flat luminescent lamp as defined in claim 1 wherein the exhaust tube is provided with a getter piece of the non-flashed type at the inner space of the tube communicating with the cavity.

9. The flat luminescent lamp as defined in claim 8 wherein the getter consists of a nickel substrate, a film of Hg - Ti alloy covering a surface of the substrate and a film of Zn - Al alloy covering the other side of the substrate, the getter being rounded and inserted into the inner space of the exhaust tube.

10. The flat luminescent lamp as defined in claim 8 wherein the extract tube is mounted with an electric heater to be heated when the lamp is turned on so as to elevate saturated vapor pressure of Hg gas from the getter in the exhaust tube.

11. The flat luminescent lamp as defined in claim 1 wherein the cavity between the upper and the lower panels is kept at a low pressure up to 5.5 Torr.

12. The flat luminescent lamp as defined in claim 1 wherein the luminescent layer on the upper glass panel has such thickness that transparency of said layer on the upper glass panel for luminescent light compared to that without the layer is maintained more than 15 percent.

13. The flat luminescent lamp as defined in claim 4 wherein the luminescent layer on the lower glass panel has such thickness that transparency of said layer on the lower glass panel compared to that without the layer is less than 50 percent.

14. The flat luminescent lamp as defined in claim 1 wherein the upper and lower glass panels are each made of a flat glass plate, the side glass wall being made of a formed rectangular glass frame sealingly connected at its upper and lower edge faces to the upper and lower glass panels, and support pieces being disposed in the cavity between the upper and lower panels.

15. The flat luminescent lamp as defined in claim 1 wherein over the outer surface of the lamp, a synthetic resin layer of high transparency and high endurance to impact is molded, allowing the exhaust tube and the lead plate to project outwardly from the resin layer.

16. The flat luminescent lamp as defined in claim 1 wherein the upper glass panel is mounted at its outer surface to an under plate of a liquid crystalline display.

17. The flat luminescent lamp as defined in claim 16 wherein the effective area of an illumination plane of the luminescent lamp is larger than an effective display area of the liquid crystalline display.

18. The flat luminescent lamp as defined in claim 16 wherein the upper glass panel is made of a flat glass plate, and the lower glass panel has side glass walls slanting outwardly from its periphery and connected by fused frit glass to the upper glass wall.

* * * * *